Figure 1:
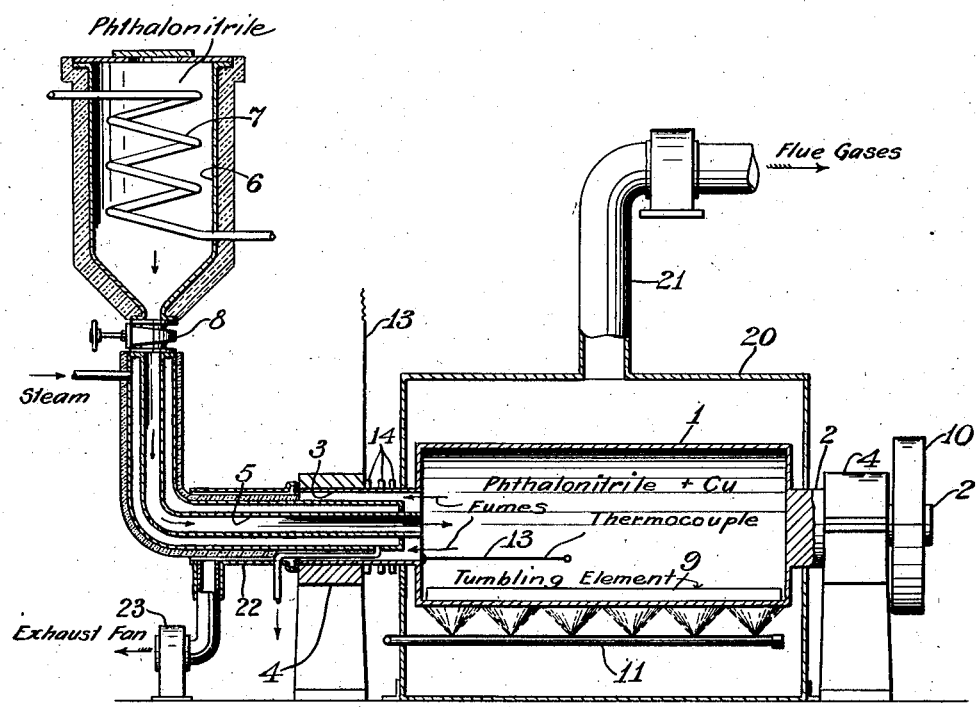

Miles A. Dahlen
Stanley R. Detrick INVENTORS
BY David Katz
ATTORNEY.

Patented Apr. 4, 1939

2,153,300

UNITED STATES PATENT OFFICE 2,153,300

MANUFACTURE OF METAL-PHTHALO-CYANINES

Miles A. Dahlen and Stanley R. Detrick, Wilmington, Del., assignors to E. I. du Pont de Nemours & Company, Wilmington, Del., a corporation of Delaware Application March 5, 1937, Serial No. 129,287

3 Claims. (Cl. 260—314)

This invention relates to an improved process for the manufacture of metal-phthalocyanines from phthalonitrile.

The reaction between phthalonitrile and a metal yielding substance, such as copper powder or cuprous chloride, at elevated temperature, is highly exothermic. When practiced on a large scale the high temperature within the charge rises so high as to cause definite injury to the quality of the pigment, both in strength and in brilliance. Furthermore, the reaction becomes so vigorous as to be dangerous to operate on any but a small scale.

To avoid the above hazards, several attempts were made in the art. According to one of these attempts, the reaction was carried out in shallow pans, with the disadvantage, however, that the quantity produced per unit apparatus in a given time is very small and therefore not very economical.

In another attempt at removing the hazard, it was proposed to carry out the reaction in the presence of inert solid diluents such as sodium chloride or silicon dioxide. This method has in turn the disadvantage that the product is obtained in admixture with foreign material from which it must be purified except for special purposes wherein the foreign material is not objectionable. Furthermore, our tests on the above process show that the improvement is not always obtainable, and is far from satisfactory in any event.

It is an object of this invention to provide an improved process for manufacturing metal-phthalocyanines from phthalonitrile and substances yielding the corresponding metal, which process shall be free of the hazards aforementioned. It is a further object of this invention to provide a process for producing metal-phthalocyanines of high quality and in an economical manner, deriving the greatest possible efficiency from a given set of apparatus in a given time. Other and further objects of this invention will appear as the description proceeds.

According to our invention the temperature of the reaction mass is controlled by feeding the reactants into the reacting chamber portion-wise, thereby avoiding undue development of heat in a short time. At the same time, the apparatus is used to its maximum efficiency inasmuch as the entire quantity of initial material corresponding to the capacity of the apparatus is entered in a relatively short time and but a single step of baking and recovery is applied to the entire mass.

More particularly, we prefer to carry out the reaction in a rotary vessel provided with means for external heating, and provided internally with means for grinding the reaction mass as the reaction proceeds. We prefer to initiate the reaction with a quantity of phthalonitrile and metal-yielding substance corresponding to about one-third or less of the optimum quantity for the given apparatus. Then, after the initial spurt of the reaction, we feed in an additional quantity of phthalonitrile and metal-yielding substance, allowing the new reaction to pass beyond its vigorous stage, and then again add a new quantity of the reaction materials, repeating the cycle until the entire material designed for a single batch has been used up.

Our invention is also susceptible of modification whereby the material may be fed in in a continuous manner.

Our invention is applicable to the manufacture of metal-phthalocyanines by starting with phthalonitrile and a suitable metal-yielding substance, or to the manufacture of substituted metal-phthalocyanines by starting with the correspondingly substituted phthalonitriles such as mono- or dihalogen phthalonitrile, mono- or dimethyl phthalonitrile, or the corresponding nitro or other derivatives. The phthalonitrile employable in our process may be in molten or solid state, and when in solid state it may be powdered or it may be in the form of ingots of substantial weight and cast into a shape that will best suit the particular apparatus employed.

As for the metal-yielding substance, our invention may be applied to the manufacture of any metal-phthalocyanine by the use of either the corresponding metals or compounds of said metals, but for the sake of simplicity the invention will be hereinbelow illustrated by specific application to the manufacture of copper-phthalocyanine.

The invention will be understood more fully by reference to the following examples and to the annexed drawing which is hereby made part of this specification. It is to be understood, however, that our invention is not limited to the precise details set forth in these examples and drawing which are submitted only for the purpose of illustration.

Referring to the drawing, Figure 1 is an elevation, partly in section, of one form of the apparatus employable with our invention, this modification being particularly suited for the use of molten phthalonitrile as initial material.

Figure 2:
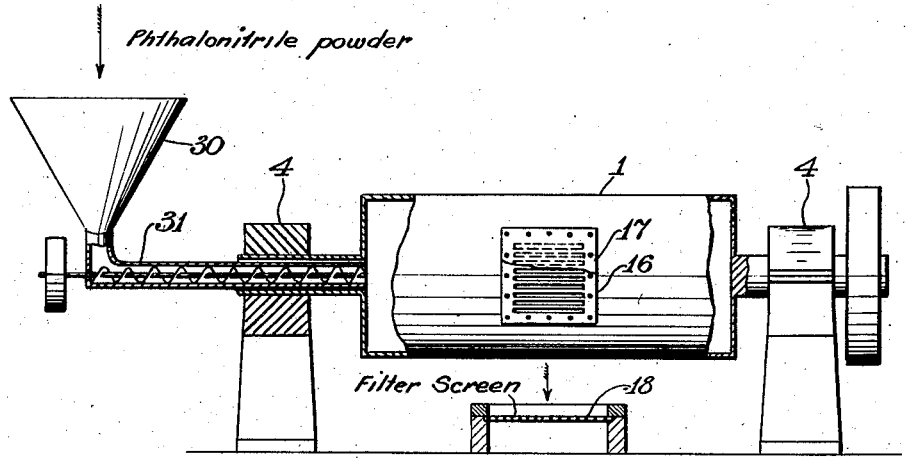

Figure 2 is a similar elevation showing a modification of our invention which is particularly adapted for the use of phthalonitrile in powder form.

Referring now to Figures 1 and 2 in detail, 1 is a hollow drum, hereinafter referred to as a rotary baker, mounted on shaft segments 2, 3 extending outward from each end of the drum, into the aligned bearings 4, 4 to form a rotatable support for the drum. The segment 3 of this shaft is hollow and leads to the interior of the drum. The rotary baker contains a number of tumbling elements 9, such as metal rods. Entering into the hollow shaft-segment 3 is an insulated, steam jacketed pipe 5 which is adapted to convey molten material from the phthalonitrile melt tank 6. The latter is provided with steam coil 7 and valve 8. The shaft segment 2 is connected to a pulley 10 or other suitable means for rotating the drum upon its shaft segments during the course of the reaction.

The rotary baker is heated by a gas jet 11, which is provided with means (not shown) for circulating air around the shaft whereby to control the temperature produced therein. A thermocouple device 13, 13 connected electrically to the inside of the drum by the aid of slip rings 14 indicates the temperature within the drum.

The baker is also provided with a grated opening 16, (shown more clearly in Fig. 2), normally covered by a plate 17, whereby its contents may be emptied onto a filter screen 18.

The baker, gas jet and filter screen are all enclosed in a suitable housing or oven 20, provided with an entry door (not shown) and a vent or chimney 21.

Over the end of the hollow shaft segment 3, including part of the feed pipe 5 fits a loose sleeve 22, provided with a fan 23, leading to an exhaust pipe (not shown), whereby to carry off any fumes issuing from the hollow drum.

In the modification shown in Fig. 2, the melting tank 6 is replaced by a hopper 30 and screw feed 31 whereby material in solid but powder form can be conveyed to the apparatus instead of the molten form. Otherwise, the construction is the same as in Fig. 1, including the oven, gas jet, thermocouple and exhaust fan, which, however, were omitted from Fig. 2, for the sake of simplifying the view and showing the other details to better advantage.

Both the melting tank with its feed line and the hopper device with its screw conveyor fit slidably into the hollow shaft segment 3, and may be removed therefrom at will, thereby providing a direct entry into the hollow shaft, through which the drum may be charged manually with solid chunks of material, if so desired. In the examples given below the parts are by weight.

It will be understood that except for the differences in the feeding device, the apparatus of Figs. 1 and 2 are identical and the features shown separately in the two figures are actually present jointly in each of the modifications. Thus, each modification is surrounded by a housing and is provided with heating means (gas jet), air circulation means, exhaust fan, etc., as explained in conjunction with Fig. 1. Likewise, each modification is provided with a grated opening, cover plate and filter screen, as explained in conjunction with Fig. 2. In either modification the phthalonitrile feeding device may be removably inserted into the hollow shaft, and may be replaced at will by one of the other types of feeding devices. The steam jacket around the feed pipe is of course necessary only where the molten form of phthalonitrile is employed, and the hollow shaft of the drum is of sufficient diameter to receive such pipe plus insulation. The latter statement is true of both Fig. 2 and Fig. 1, but the drawing in Fig. 1 has been exaggerated in scale on the hollow shaft side for the sake of showing the details of construction more clearly.

*Example 1*

50 parts of phthalonitrile and 7 parts of copper powder are introduced into the rotary baker 1 (Fig. 1). Agitation is started and the temperature is raised to 220° C. as rapidly as possible. A vigorous reaction takes place and the temperature increases to 240° C. After the reaction has subsided, another 7 parts of copper powder are added through the hollow shaft, the phthalonitrile feeding device 6—5 being temporarily slid out of the hollow shaft for this purpose, to provide manual access thereto. Meanwhile, 100 parts of phthalonitrile are melted in the auxiliary melt tank 6. The phthalonitrile feeding device is now moved back into place, and 50 parts of the molten material are added to the jacketed line 5 extending into the baker through the hollow shaft. A new spurt of reaction takes place and when this has subsided, a third 7-parts portion of copper powder and the remainder of the molten phthalonitrile are added in the same manner as above. The baker is maintained at 230 to 240° C. during these additions. After all active exothermic reaction is over, the charge is baked for four hours at 230° C. to insure completion of the reaction.

After purification of the reaction mass by dissolving in concentrated sulfuric acid and drowning in hot water, a good yield of pigment of excellent quality as to brilliance and strength is obtained.

*Example 2*

300 parts of phthalonitrile and 45 parts of copper powder are mixed intimately in a ball mill. The reaction is carried out in a long iron tube closed at one end and heated externally by means of an oil bath. The contents of the tube and the oil bath both are agitated.

The inside temperature of the tube is raised to 240° C. 10 parts of the mixture from the ball mill are added, whereupon the temperature which at first drops to 220° C. rises immediately to 245° C. Additions are made further at intervals of 4 to 5 minutes until all of the charge has been added, the inside temperature fluctuating between 220 and 250° C. Thereupon the charge is baked for a total of two hours.

After purification by solution in concentrated sulfuric acid and drowning in hot water, a good yield of high quality pigment is obtained.

*Example 3*

28 parts of copper powder are charged into a rotary baker and the temperature brought to 240° C. 200 parts of phthalonitrile are cast into cylinders containing approximately 10 parts of material each. These are added during two hours, through the hollow shaft of the baker, the feeding devices 6—5 (Fig. 1) or 30—31 (Fig. 2) being entirely removed in this case, in order to provide direct manual access into the hollow shaft. After each addition, evidence of reaction is observed as fumes of the nitrile issue from the shaft in the form of a white cloud. After all the nitrile has been added, the baker is agitated for another two hours at 240° C.

After purification by solution in concentrated sulfuric acid and drowning in hot water, a good yield of high quality pigment is obtained.

*Example 4*

50 parts of phthalonitrile and 7 parts of copper powder are charged into the rotary baker and the temperature brought to 240° C. After the reaction is over, another 7 parts of copper powder are added to the baker. 50 parts of phthalonitrile, cast into cylinders, are added and the reaction is allowed to subside. The operation is repeated a third time. The charge is baked 5 more hours at 240° C. A good yield of high quality pigment is obtained.

It will be understood that although the above examples illustrate the invention only in the case of copper powder, it is likewise applicable to the manufacture of other metal phthalocyanines by the use of other metals, for instance, manganese, tungsten, chromium, iron, nickel, cobalt, magnesium, lead, cerium, tin, bismuth and molybdenum. Likewise, instead of the free metals, compounds capable of yielding these metals at elevated temperature may be employed, for instance, cuprous chloride, cuprous and cupric oxides, cupric sulfide, cupric acetate, cupric sulfate, stannous chloride, cobaltous chloride, nickelous chloride, aluminum chloride, barium chloride, copper nitrate and molybdenum oxide.

Of course, it will be realized that when using a salt of a metal instead of the free metal in the above reaction, the temperature is regulated so as to correspond to the optimum for the particular metal compound. For instance, when cuprous chloride is employed, the preferred temperature is between 150° and 170° C.; when aluminum chloride is used, the preferred temperature is between 230° and 250° C. In general, the optimum temperature falls as a rule between 150° and 250° C., and can be determined by observation in each particular case.

In lieu of phthalonitrile, substituted phthalonitriles may be employed, for instance, 3-methyl-phthalonitrile, 3-chloro-phthalonitrile, 3,4-dichloro-phthalonitrile, 3-nitro-phthalonitrile, 3-sulfo-phthalonitrile, etc.

It will be clear now that by the above invention we have provided an improved process for manufacturing metal-phthalocyanines whereby excessive generation of heat, with resultant hazard of explosions, is eliminated. Furthermore, the product obtained is superior in quality, particularly as to brilliance and strength, to products which are obtained without careful temperature control. Our process also is characterized by high efficiency and economy inasmuch as it makes maximum use of apparatus and time. Finally, our process is adapted for conversion into a continuous process whereby both the initial material is continuously fed into the apparatus and the reaction product continually removed.

We claim:

1. A process for the manufacture of copper phthalocyanine which comprises heating together phthalonitrile and copper in a quantity so limited as to avoid the development of a temperature above 250° C., then adding another quantity of phthalonitrile, likewise avoiding the development of a temperature above 250° C. and repeating the cycle until the apparatus is substantially full of reacting materials to its optimum capacity, then baking the entire mass at a temperature between 220° and 250° C. and recovering the reaction mass.

2. The process of manufacturing copper phthalocyanine which comprises heating a vessel containing copper powder to a temperature between 220° and 250° C., then adding into the vessel phthalonitrile in the form of solid units which are adapted to react with the copper to form copper-phthalocyanine inside the heated vessel, the material being fed in at such a rate that each preceding unit has been substantially completely consumed before the addition of the next solid unit, and finally baking the entire contents of the vessel at a temperature between 220° and 250° C. for a period of 2 to 5 hours.

3. A process as in claim 1, wherein in each cycle an additional quantity of copper is added jointly with the phthalonitrile.

MILES A. DAHLEN.
STANLEY R. DETRICK.